P. S. SIDELL.
ROLLING COLTER AND JOINTER ATTACHMENT FOR PLOWS.
APPLICATION FILED DEC. 21, 1916.

1,250,371. Patented Dec. 18, 1917.

Inventor:
Philip S. Sidell
By Hiram B. Swartz Atty.

UNITED STATES PATENT OFFICE.

PHILIP S. SIDELL, OF NEAR HOLMESVILLE, OHIO.

ROLLING COLTER AND JOINTER ATTACHMENT FOR PLOWS.

1,250,371.  Specification of Letters Patent. Patented Dec. 18, 1917.

Application filed December 21, 1916. Serial No. 138,201.

*To all whom it may concern:*

Be it known that I, PHILIP S. SIDELL, a citizen of the United States, residing near Holmesville, in the county of Holmes and State of Ohio, have invented a new and useful Rolling Colter and Jointer Attachment for Plows, of which the following is a specification.

My invention relates to rolling colters and jointer attachments for plows, and is more particularly intended as an improvement upon the structure shown in Patent No. 1,106,739, issued to me August 14, 1914, and on combined rolling colters and jointers as heretofore devised.

Rolling colters as heretofore used with plows have been arranged and suspended some distance in front of the cutting edge of the plow, and, by reason thereof, their efficiency for cutting weeds and rubbish and thereby preventing the same from clogging the plow, has been diminished for want of an opposing blade adapted to coact with the blade of the colter. Moreover, such arrangement made the colter liable to lift the plow from its furrow by striking stones and other obstructions in its pathway, and also made it somewhat difficult to arrange the jointer so as to have its blade contact with one side of the colter, as shown in said patent.

The objects of the present invention are, first, to provide a rolling colter adapted to coact with the cutting edge of the plow in a manner similar to a pair of shears, whereby weeds and other rubbish will be more effectually cut apart in the path of the plow than heretofore; second, to locate and support the colter disk at some distance back of the plow point and adjacent to the land side of the plow, and thus prevent the disk from striking obstructions in such manner as to displace the plow from its furrow, and at the same time adapt it to cut the sod in front of the plow more effectually than heretofore; and, third, to adapt the jointer, either in form of a curved blade or of a rotary disk, to coact with both the cutting edge of the plow and of said colter combined in such manner as to more effectually cut the sod and cover debris than heretofore, all as hereafter more particularly described and claimed.

My invention is illustrated by the accompanying drawings in which—

Figure 1:
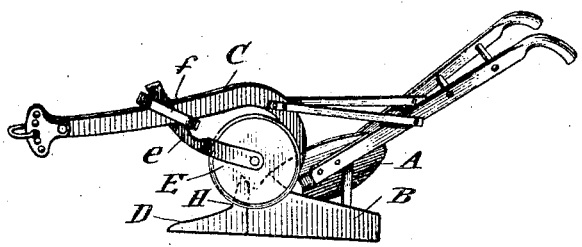
Figure 2:
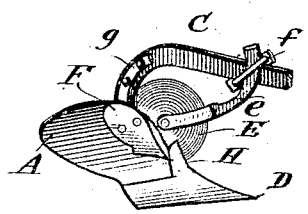
Figure 3:
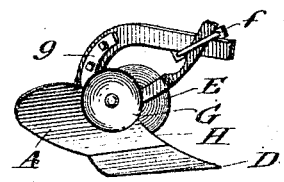
Figure 4:
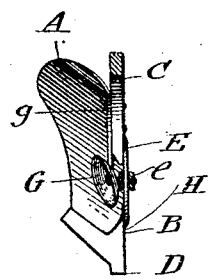

Figure 1 is a land-side view of a plow embodying my invention; Fig. 2 exhibits the moldboard side of the same with jointer attachment; Fig. 3 is a side view, similar to Fig. 2, showing a modification of the jointer attachment; and Fig. 4 is a front view of the fore part of a plow, showing relative positions of rolling colter and jointer combined, each adjacent to and coacting with one side of the plow opposite its cutting edge, a hollow disk being used as a jointer instead of the curved blade shown in Fig. 2.

In the several figures, A, B, C and D designate the moldboard, land-side, beam or standard, and point, respectively, of an ordinary furrow plow.

Extending forwardly from the beam C is a rearwardly curved arm $e$, on the lower end of which is pivotally mounted a rotary disk E, such as is in common use. Said arm is preferably secured to the beam by a U-shaped band $f$ so as to be adjustable thereon laterally and vertically, and particularly in such manner as to hold one side of the periphery of said colter E against the adjacent edge of the front and upper part of the land-side B, substantially as shown in Fig. 1.

In order to lessen any shocks or injury to the edge of said colter E from striking stones or other obstructions in its path, the arm $e$ is made resilient vertically and laterally by means of an intermediate portion integral therewith of suitable spring metal. I am aware it is not new to provide a resilient mounting for a disk colter, and such I do not broadly claim; my improvement lies in providing simpler and more efficient means for absorbing shocks from obstructions, and for maintaining a constant resilient pressure of the cutting edge of the disk upon and against the upper adjacent cutting edge of the moldboard and landside member so as to shear thereon yieldingly.

I accomplish this by means of the downwardly and rearwardly extended resilient arm aforesaid secured in such manner as to support the disk at a point farther back from the plow point and higher up therefrom than has been heretofore possible, thereby lessening the liability of the plow to be dislodged by the disk striking obstructions in its path, and enabling the plow point to enter the soil farther in advance of the disk than has been possible heretofore, which is of considerable advantage in plowing.

F is a jointer blade which is adjustably attached to the beam or standard C by the arm g; its construction and location with respect to the moldboard A being very similar to that set forth in my said former patent, no claim is now made thereto, except as the same is related to the said rotary colter when it engages and coacts with said land-side, as aforesaid.

G is a hollow rotary disk, which is pivotally mounted upon the lower end of the arm g which is also preferably secured adjustably to said beam or standard. The particular method of its attachment is immaterial provided it is so arranged and mounted on its axis as to have its convex side adjacent to the moldboard, and at such an angle therewith as to have its peripheral edge in contact with the adjacent surface of the moldboard, or nearly so, and preferably at a little distance back of the cutting edge of the plow, and its upper peripheral edge projected outwardly from the moldboard at an angle therewith sufficient to cause the hollow of said disk to turn a portion of the top of the furrow slice into or toward the furrow in advance of the slice turned by the moldboard.

The advantages of combining such hollow rotary disk on the moldboard side with the opposite rotary disk on the land-side are particularly noticeable in plowing sod ground; in loose soils either one or both of said rotary disks may be detached, if desired; and in such soils said concave disk jointer has some advantages over a curved blade jointer such as shown in my said former patent; but, in general, they may be interchangeably used as best suited to the nature and condition of the soil.

It will be seen that by mounting the rotary disk colter E with its cutting edge adjacent to the upper part of the cutting edge of the land-side B, as aforesaid, so as to coact therewith, they will mutually coact as a pair of shears, while the forward edge of the colter disk will cut the sod, and debris, if any, in advance thereof.

Having thus fully described my invention, what I claim as new and desire to secure by Letters Patent is—

1. In a plow, the combination with a landside member having an upwardly extended cutting edge in front thereof, of a rotary colter disk having a peripheral cutting edge, said disk mounted to rotate in a plane with the face of said landside member in such a manner that the cutting edge of said disk engages the cutting edge of said landside member near its top so as to shear thereon at said point when said disk rotates, and means for supporting said disk in said position, substantially as set forth.

2. In a plow, the combination with a land-side member having a front cutting edge, and a rotary colter disk mounted to rotate adjacent to said cutting edge, of a jointer blade mounted adjacent to the moldboard of said plow directly opposite said colter disk, and means for supporting said blade and disk in operative positions respectively, substantially as set forth.

3. In a plow, the combination of a landside member having a front cutting edge, a rotary colter disk mounted to rotate adjacent to said cutting edge, a jointer blade mounted adjacent to the moldboard of said plow and back from its cutting edge, and opposite to said colter disk, and means for supporting said blade and disk in operative positions, respectively, substantially as set forth.

4. In a plow, the combination with a moldboard member and a land-side member having a common front cutting edge, a rotary colter disk mounted to rotate adjacent to said land-side member and in a plane therewith, and having its cutting edge in operative engagement with the said front cutting edge, a concave rotary disk mounted to rotate adjacent to the moldboard member at an angle therewith opposite said colter disk, and means for adjustably supporting said disks, respectively, in position on said plow, substantially as set forth.

5. In a plow, a landside member, a beam or standard, a rearwardly and downwardly extended arm in plane of said landside member, said arm having an intermediate spring portion integral therewith, said arm adjustably secured to the standard at its upper end, and at its lower end adapted to resilient action on said spring portion, in combination with a rotary disk colter mounted on said lower end to rotate with its peripheral edge in operative engagement with the cutting edge of said landside member near its top, so as to shear thereon yieldingly when rotating, substantially as set forth and for the purpose specified.

In witness whereof I have hereunto set my hand this 4th day of November, 1916.

PHILIP S. SIDELL.

In presence of two witnesses:
HIRAM B. SWARTZ,
WALTER J. MOUGEY.